United States Patent
Hugelman et al.

[11] 3,942,649
[45] Mar. 9, 1976

[54] TRANSFER MECHANISM

[76] Inventors: Rodney Dale Hugelman, 700 W. Chrysler, Lot 329, Belvidere, Ill. 61018; Raymond Anton Kucharchuk, 2228 W. Hart Road, Rt. 5, Beloit, Ill. 53511; Charles L. Goss, 2920 Imperial Oaks Drive, Rockford, Ill. 61111

[22] Filed: Oct. 29, 1973

[21] Appl. No.: 410,615

[52] U.S. Cl. .............................. 214/1 BH; 221/212
[51] Int. Cl. ............................................... B66c 1/02
[58] Field of Search... 214/1 BB, 1 BC, 1 BT, 1 BH; 221/210, 212; 308/DIG. 1, 9

[56] References Cited
UNITED STATES PATENTS

| | | | |
|---|---|---|---|
| 1,631,748 | 6/1927 | Martin | 221/212 X |
| 2,600,849 | 6/1952 | Collins et al. | 221/210 X |
| 3,212,649 | 10/1965 | Johnson et al. | 214/1 BC |
| 3,349,927 | 10/1967 | Blatt | 214/1 BT |
| 3,556,315 | 1/1971 | Berger | 214/1 BB |
| 3,687,506 | 8/1972 | Dee | 308/9 |
| 3,760,956 | 9/1973 | Burch | 214/1 BC X |

Primary Examiner—Robert B. Reeves
Assistant Examiner—Joseph J. Rolla
Attorney, Agent, or Firm—Vincent L. Carney

[57] ABSTRACT

To move a workpiece from one location to another, the main body of the transfer mechanism is raised on an air bearing and pivoted automatically or manually from station to station, with the workpiece being held by a gripping head mounted to one end of the main body by a tranfer arm. To control the gripping head, a piston, slidably mounted within the transfer arm, is biased away from the gripping head so that, when air pressure is applied, it is forced toward the gripping head and, when air pressure is removed, it is moved away from the gripping head with the gripping head being provided with any one of a number of interchangeable piston-controlled gripping devices. To control the air pressure in the transfer arm, two external sensing switches are mounted outside the main body to control the flow of air, which switches are activated when the body is lowered. The automatic control system for the transfer mechanism utilizes an air logic system which is biased so that, upon the reapplication of power after an accidental interruption, the transfer arm will remain stopped and in the manual mode.

17 Claims, 8 Drawing Figures

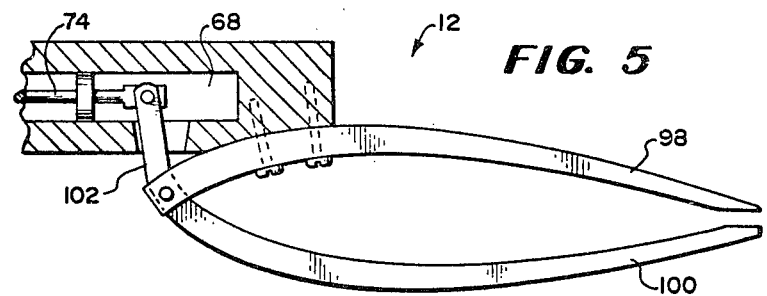
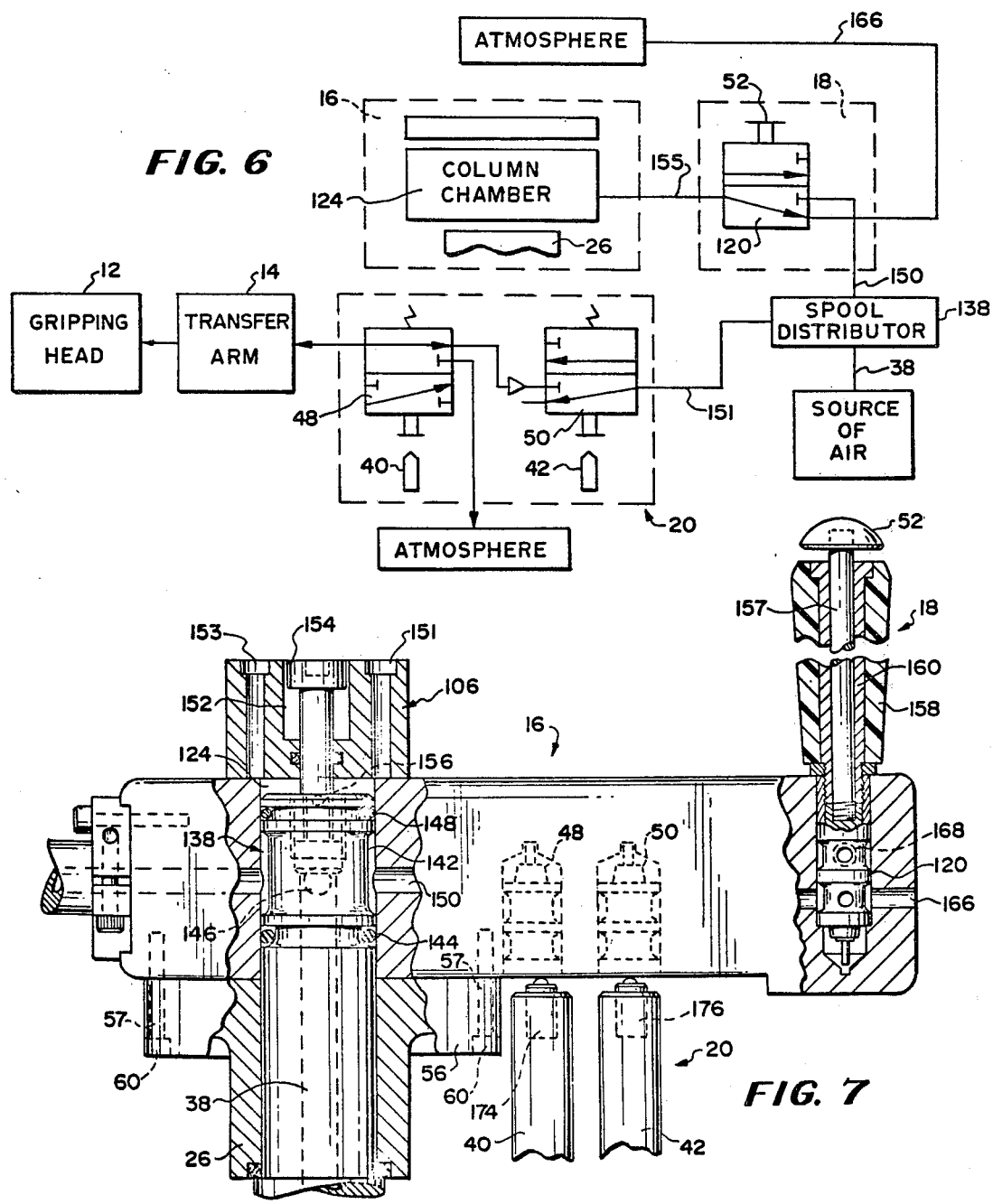

TRANSFER MECHANISM

This invention relates to transfer mechanisms.

In one class of transfer mechanism, a centrally-located main body pivots upon a central support column with a transfer arm and gripping head extending from one side of the main body. The main body of the transfer mechanism is elevated and pivoted to move the gripping head to and from the stations in which it is to receive or deposit a workpiece.

In a prior art type of transfer mechanism of this class, the rising, pivoting and falling of the main body of the transfer mechanism and the gripping and releasing of a workpiece are all done automatically. If power is interrupted during the operation of this type of device, the workpiece is released and the main body remains motionless until the power is restored, at which time the main body of the transfer mechanism continues with the interrupted operation from where the interruption occurred.

This prior art type of transfer mechanism has several disadvantages such as: (1) it is inefficient for transferring workpieces intermittently when the workpieces are to have other operations performed upon them before another workpiece is transferred by the transfer mechanism such as occurs in the making of a series of different one-of-a-kind parts; (2) if a workpiece is being carried when the power is interrupted, it may be dropped at a location where damage can be done; and (3) if the power is suddenly restored, the transfer mechanism may continue its operation although the workpieces or the work stations are not in condition for continued operation.

In another class of transfer mechanism, the transfer mechanism is hand operated to control at least some of the functions of gripping a workpiece and moving it to and from a work station.

In one prior art type of transfer mechanism of this class, the gripping head is moved between stations under the control of a single handle but the gripping of the workpiece and the releasing of the workpiece are performed manually by a different control that requires the use of the operator's hands at a different location from the handle.

This prior art type of transfer mechanism has the disadvantages of: (1) requiring that the operator release the handle to perform some operations, thus losing some control over the transfer mechanism; and (2) being relatively slow and expensive to use when a plurality of identical operations are to be performed by a single machine on a plurality of workpieces since each must be moved manually.

Accordingly, it is an object of the invention to provide a novel transfer mechanism.

It is a further object of the invention to provide a transfer mechanism that is simple in structure, reliable and inexpensive.

It is a further object of the invention to provide a transfer mechanism that is easily set up for operation to receive and release workpieces at fixed locations.

It is a still further object of the invention to provide a transfer mechanism in which the set up for gripping and releasing workpieces is the same whether the transfer mechanism is operated manually or automatically.

It is a still further object of the invention to provide a transfer mechanism in which the setup for determining the location where a workpiece is to be gripped or released may be easily checked visually.

It is a still further object of the invention to provide a transfer mechanism in which all of the operations may be controlled with one hand on the control handle.

It is a still further object of the invention to provide a transfer mechanism which is safe in operation.

It is a still further object of the invention to provide a transfer mechanism which continues to hold a workpiece even though the power has been accidentally disconnected from the transfer mechanism.

It is a still further object of the invention to provide a transfer mechanism in which a plurality of different types of gripping heads are interchangeably usable.

It is a still further object of the invention to provide a transfer mechamism which discontinues operation when the power is applied after having been accidentally interrupted during automatic operation of the transfer mechanism.

It is a still further object of the invention to provide a transfer mechanism which pivots about an air bearing.

It is a still further object of the invention to provide a transfer mechanism which releases or grips a workpiece automatically upon being lowered into the position of the workpiece.

In accordance with the above and further objects of the invention, a transfer mechanism includes a main body, a support column, a control handle, a transfer arm, and a gripping head. The control handle is mounted to one end of the main body and the transfer arm is mounted to the other end, with the support column being mounted to a central location so that the main body pivots about the support column, moving the transfer arm as the control handle is moved in a horizontal plane, the gripping head being mounted to the end of the transfer arm.

A piston is movably mounted within the transfer arm and includes a piston rod reciprocably movable in a line with the gripping head. The piston and piston rod are biased by a spring away from the piston head so that, when air pressure is applied through the main body to the transfer arm, the piston and piston rod are moved in the direction of the gripping head, and when the air pressure is removed, are moved away from the gripping head.

The gripping head is adapted to receive different types of gripping devices. A first type of gripping device includes a permanent magnet mounted to a vertically positioned shaft within the gripping head, which shaft includes an aperture adapted to engage a ramp formed on one end of the piston rod so that, as the piston rod is moved toward the head, the magnet is moved upwardly into the gripping head to free a workpiece and, as the piston rod is moved away from the head, the magnet is moved downwardly to engage a workpiece.

A second type of gripping device is a suction cup positioned with its convex side communicating with the transfer arm through an opening, so that, as the piston moves forward, air is forced into the concave side of the suction cup to release the vacuum pressure and, as the piston moves away from the gripping head, the vacuum pressure is increased to hold the workpiece.

A third type of gripping device is a pair of tongs which are moved together to grip a workpiece as the piston rod moves toward the gripping head and moved apart to release the workpiece as the piston rod is moved from the gripping head.

To lift the body upwardly so that it may be pivoted freely on the column, the control handle includes a button that connects the chamber between the main body of the transfer mechanism and the support column to a source of pneumatic pressure. To actuate the gripping head, the transfer arm is connected to a source of pressure under the control of two sensors each having at least a portion mounted in fixed relation with respect to the support column and adjusted to correspond to locations at which the gripping head is to be actuated. When positioned properly, a first of the sensors actuates a first pressure switch when a sensor probe is lowered upon the sensor, causing a magnetic or vacuum gripping head to release or tongs to grip a workpiece and the second sensor actuates the second pressure switch when the sensor probe is lowered upon the second sensor causing a magnetic or vacuum gripping head to grip or tongs to release a workpiece in a first embodiment. In a second embodiment the probes are stationary once positioned and pressure-sensitive switches, carried by the moving portion of the transfer body, are lowered upon the probes to control the gripping devices.

In operating the transfer mechanism automatically, the raising, lowering and pivoting of the body of the transfer mechanism is controlled by an air logic system, with a pneumatic cylinder providing the force for pivoting the main body of the transfer mechanism. The air logic system and pneumatic cylinder are easily connected to the transfer mechanism when automatic operation is desired.

Before operating the transfer mechanism, the type of gripping head is selected and inserted and the sensor probe positioned so that: (1) for a magnetic or vacuum gripping head, a probe activates the second sensor switch when the gripping head is lowered from just above the supply of workpieces and a probe activates the first sensor switch when the gripping head is lowered from above the work station in a machine that is to receive the workpieces, and (2) for a tong gripping head, a sensor probe activates the first sensor switch when the gripping head is lowered from above the supply of workpieces and a sensor probe activates the second sensor switch when the gripping head is lowered from above the work station.

After the sensor probe is properly positioned, the transfer mechanism is manually operated or automatically operated.

In manual operation the transfer mechanism is operated with one hand upon the control handle at all times. At a starting position, the button on the control handle is extended, the operator's hand is upon the control handle, the main body of the transfer mechanism is in its lower position with the sensor probe contacting a sensor switch, and the workpiece is held within the gripping head. In this position, if the gripping head is a magnet, the sensor probe contacts the second sensor switch and the piston rod is spring biased rearwardly permitting the magnet to move downwardly to engage the workpiece; if the gripping device is a vacuum suction cup, when the sensor probe contacts the second sensor switch, and the piston creates a vacuum to firmly grip the workpiece; and if the gripping device is a pair of tongs, sensor probe operates the first sensor switch and the piston rod pushes the linkage to bring the tongs together and grip the workpiece.

To raise the body of the transfer mechanism, the operator now depresses the button on the control handle, which permits air under pressure to flow through a valve into a chamber between the top of the support column and the body of the transfer mechanism, causing the main body to be raised. When the main body is elevated, the operator pivots the body of the transfer mechanism by moving the contol handle while maintaining the control button depressed until the gripping head and workpiece are in the station of the machine where the workpiece is to be released.

To grip or release the workpiece, the operator releases the control button, which causes the valve to connect the chamber between the support column and the body of the transfer mechanism to atmospheric pressure and closes the connection to the source of pressurized air, thus permitting the body to fall downwardly against the support column.

When the body of the transfer mechanism falls downwardly, the sensor probe contacts the first sensor switch, which applies air under pressure to the transfer arm to move the piston and piston rod forwardly or exhausts pressure to atmosphere if the gripping head includes tongs, thus permitting the piston and piston rod to return rearwardly. As the piston and piston rod move forwardly or rearwardly, depending upon the gripping head selected, the gripping head releases the workpiece into the work station.

In releasing the workpiece, if the gripping mechanism is a magnet, the piston rod moves into the shaft with a ramp-like portion upward to lift the magnet and knock the workpiece free against the downwardly extending sides of the gripping head; if the gripping device is a suction cup, the piston forces air into the gripping head and against the convex portion of the suction cup, forcing it outwardly to release the workpiece; and if the gripping device is a pair of tongs, the piston rod moves a linkage rearwardly to spread the tongs, thus releasing the workpiece.

After the workpiece has been released, the operator again depresses the control button to connect the source of pressurized air to the chamber between the support column and the body of the transfer mechanism. This causes the body of the transfer mechanism to rise and again be freely pivotable about the air bearing formed between it and the support column. The operator now pivots the main body of the transfer mechanism to return the gripping head to the source of workpieces.

When the gripping head is over the source of workpieces, the operator releases the control button thus permitting the body of the transfer mechanism to fall. When the body of the transfer mechanism falls, the sensor probe contacts the second sensor switch if the gripping head is magnetically or vacuum operated, connecting the transfer arm to atmospheric pressure and disconnecting the source of pressurized air therefrom or the first pressure switch if the gripping head includes tongs to apply air under pressure to the transfer arm to move the piston rod forwardly. The piston in the transfer arm is now biased rearwardly or move forward to cause the gripping head to again grip a workpiece.

In automatic operation, the sensor is set up in the same manner as in manual operation. Accordingly, the gripping and releasing of the workpieces are performed in the same manner. However, the lifting, dropping and pivoting of the main body are performed under automatic control.

To lift and drop the main body, an air logic circuit controls the application of air pressure to the chamber between the column and the body of the transfer mechanism in response to sensing devices that sense the location of the gripping head. The air logic circuit also controls the pneumatic cylinder to pivot the body of the transfer mechanism.

The air logic circuit includes a switch which biases the air logic circuit to the manual state or disconnect state of operation for safety reasons.

As can be understood from the above description, the transfer mechanism has several advantages such as: (1) it is simple in construction and thus reliable and inexpensive; (2) it is easily set up for operation to receive and release workpieces at fixed locations; (3) the set up for receiving workpieces and releasing them is the same whether in automatic or manual operation; (4) it provides an automatic technique for locating the exact place to release or grip a workpiece during manual operation; (5) the set up may be visually checked by inspecting the sensor probe and sensor location; (6) it enables manual control of the transfer mechanism with one hand without requiring the control handle to be released during operation: (7) the gripping head holds the workpiece when the power is accidentally disconnected; (8) several different types of gripping devices are easily interchangeable within the transfer arm; (9) the workpiece is always released when the transfer arm is in its lowest position; and (10) when power is connected after an accidental interruption during automatic operation, the machine switches to manual operation so that the operator must return it to automatic operation after visual inspection, thus avoiding accidental operation of the machine before it is ready.

The above noted and other features of the invention will be better understood from the following detailed description when considered with reference to the accompanying drawings, in which:

FIG. 5 is still another embodiment of gripping head which may be used in the transfer mechanism of FIG. 1;

FIG. 6 is a schematic diagram of the pneumatic system of the transfer mechanism of FIG. 1;

FIG. 7 is a fractional, elevational view of the transfer mechanism of FIG. 1 partly broken away.

GENERAL STRUCTURE AND OPERATION

Figure 1:
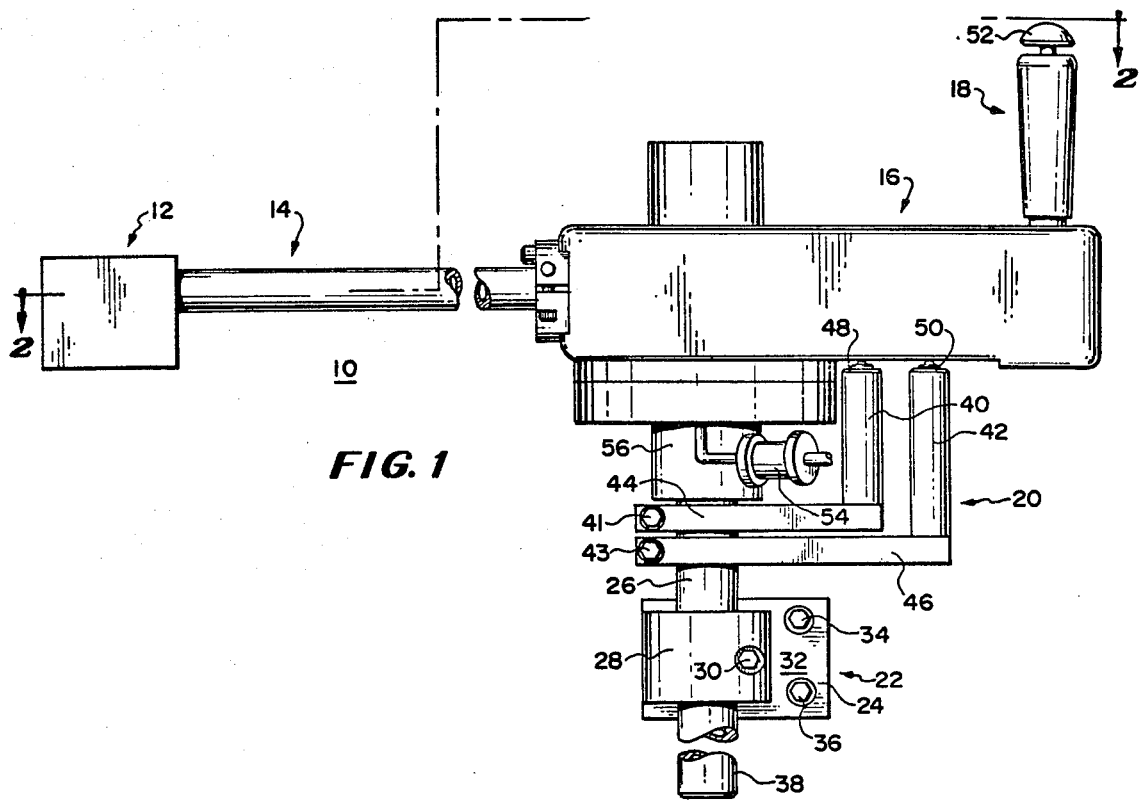
FIG. 1 is a side elevational view of a transfer mechanism in accordance with an embodiment of the invention.

In FIG. 1, there is shown a transfer mechanism 10 having a gripping head 12, a transfer arm 14, a main body 16, a control handle 18, a load-unload control section 20, and a mounting section 22, with the main body 16 being pivotally mounted to the mounting section 22, having the control handle 18 on one side and the transfer arm 14 on its other side, the gripping head 12 being mounted to the far end of the transfer arm. The load-unload control section 20 is mounted to the mounting section 22 adjacent to the main body 16.

To mount the transfer mechanism 10 to a support, the mounting section 22 includes a bracket 24, a transfer-mechanism support column 26, a collar 28, and a flat mounting plate 32. The bracket 24 receives the transfer-mechanism support column 26 in the collar 28, the collar 28 being mounted to the support column 26 and held tightly therearound by a bolt 30. The flat mounting plate 32 is integrally formed with the collar 28 and includes apertures which receive bolts 34 and 36 for supporting the column against any suitable surface, with the column 26 being adjustable within the collar 28 for any height of the main body 16 of the transfer mechanism 10.

To move the gripping head 12 between a supply station and a work station or between a work station and another location, the main body 16 is pivotally mounted to column 26 at its bottom side with the transfer arm 14 extending horizontally from one end and the control handle 18 extending vertically from the other end so that the transfer arm 14 and the gripping head 12 are pivoted about the column 26 in either direction and raised or lowered by proper manipulation of the control handle 18.

To enable a workpiece held in the gripping head of 12 to be deposited at a precise location, the loading-control section 20 includes first and second vertically arranged probes, 40 and 42, first and second probe arms 44 and 46, first and second probe arm bolts 41 and 43 and first and second pressure-sensitive switches 48 and 50 (FIGS. 6 and 7).

The first and second probe arms 44 and 46 are supported by column 26 horizontally, one under the other being adjustably clamped thereto by the first and second probe arm bolts 41 and 43, respectively. The probes 40 and 42 each extend vertically from the end of a different one of the probe arms 44 and 46, being bolted thereto, with the probe 42 being a greater distance from the column 26 than the probe 40. The pressure sensitive switches 48 and 50 are positioned to cooperate with the probes 40 and 42, respectively, and are each mounted the same radial distance from the column 26 as the corresponding probes 40 and 42 within the bottom side of the body portion of 16 so that, by positioning the probes 40 and 42 at fixed angular locations, the gripping head is activated at a predetermined location diametrically opposite the probe from the support column 26 by lowering the main body 16 onto the probe, thus causing the corresponding one of the pressure-sensitive switches 48 and 50 to be activated.

While probes and pressure-sensitive switches are included in the preferred embodiment of a loading-unloading control section 20, it is obvious that other types of switching mechanisms can be used instead. For example, switches that are activated by reflected light or by electromagnetic radiation may serve the same function. Moreover, the positions of the switches and probes may be reversed so that, for example, the probes are mounted on the main body 16 while the pressure-sensitive switches are mounted to the radially extending arms 44 and 46 or to another holder fixed in position with respect to the loading or work stations.

To raise or lower the gripping head 12, the control handle 18 includes a pressure-sensitive control button 52 on its top end, which control button raises the main body 16 about the support 26 when depressed. When the main body 16 is in its elevated position with the button 52 on the control handle 18 depressed, the main body 16 is free to pivot about the column 26, which is accomplished simply by pulling the handle 18 in one direction or the other. Upon releasing the control button 52, the main body 16 falls to its lower, stationary position.

To automatically pivot the main body 16 about the column 26, the main body 16 includes a top portion 55, a base 56, a plurality of socket head screws 57 (FIG. 7) and a pneumatic cylinder 54. The base 56 rests upon a shoulder in the column 26 and the top portion 55 rests upon the base 56 and receives the socket head screws 57 in vertical apertures that extend through the base 56 and into aligned apertures in the top portion 55. The pneumatic cylinder 54 is mounted horizontally to any suitable stationary support by mounting brackets with its piston rod 59 mounted at its outer end to the base 56 so that the extension and retraction of the piston rod of the pneumatic cylinder 54 pivots the base 56, thus causing the top portion 55 to be pivoted by the connection to the base 56 through the screws 57 while permitting the top portion 55 to be raised or lowered.

Before operating the transfer mechanism 10, the probes 40 and 42 are positioned with respect to the supply of workpieces and the work station of a machine. Generally, the workpieces are automatically fed to a fixed location and the transfer mechanism 10 transfers them to a work station such as into a punch press. The transfer mechanism 10 may also remove them from the work station to another location after they have been worked upon if the punch press does not have an automatic ejection mechanism. A different one of the probes is positioned to actuate the gripping head 12 at each location.

To position the probe 40, the bolt 41 on the probe support 44 is loosened, the probe 40 and probe support 44 are rotated into position, and the bolt 41 is tightened so that the gripping head 12 is over the selected location when the switch 48 is over the probe 40. The probe 42 is adjusted in the same manner at another location in which the switch 50 is over the probe when the workpiece is in a work station.

The transfer mechanism 10 may be operated either manually or automatically to move workpieces from one location to another.

In manual operation, an operator holds the control handle 18 and physically pivots the main body 16 and the gripping head 12 while the main body 16, transfer arm 14 and gripping head 12 are elevated. The main body 16, transfer arm 14 and gripping head 12 are elevated by depressing and lowered by releasing the control button 52 on the handle 18.

To grip a workpiece in the gripping head 12 during manual operation of the transfer mechanism 10, the operator depresses the control button 52, causing the main body 16, the transfer arm 14 and the gripping head 12 to be elevated. With these parts elevated, the operator moves the gripping head 12 over the workpiece by exerting pressure in a horizontal plane upon the handle 18 so that the gripping head 12 pivots about the column 26 until it is located over the workpiece. At this time, because of the previous setting, one of the probes 40 and 42 is located directly under a corresponding one of the presssure switches 40 and 50.

To pick up the workpiece, the button 52 is released while the gripping head 12 is directly over the workpiece. This causes the gripping head 12 to fall upon the workpiece and the pressure switch to fall upon the corresponding probe by gravity. When the probe contacts the pressure switch, the gripping head 12 grips the workpiece.

To move the workpiece to a new location after the gripping head 12 has gripped it, the control button 52 is depressed by the operator, thus elevating the main body 16, the transfer arm 14 and the gripping head 12. With these parts elevated, the operator moves the gripping head 12 with the workpiece to a new location by exerting pressure in a horizontal plane in the appropriate direction from the handle 18 until the gripping head 12 is properly located. This time, a different one of the probes 40 and 42 is located directly under the corresponding one of the pressure-activated switches, 40 and 50.

With the gripping head 12 and pressure switch in the proper location, the button 52 is released, causing the gripping head 12, the transfer arm 14 and the body portion 16 to fall by gravity. When the main body 16 falls, the pressure-activated switch is activated causing the workpiece to be released. After the workpiece has been released in its proper location, the transfer arm 14 is moved to the source of workpieces or to a neutral position to await work upon the workpiece if the workpiece is not to be automatically ejected by the machine.

To move the transfer arm 14 to the supply of workpieces or to a neutral location, the button 52 is depressed to elevate the main body 16, the transfer arm 14 and the gripping head 12. Thr gripping head 12 is moved to a new location by exerting pressure upon the handle 18 in a horizontal plane.

In automatic operation, an automatic-operation pneumatic-control system (FIG. 8) applies control signals to the transfer mechanism 10 in a manner to be described hereinafter to perform the same operations that are performed during manual operation.

Figure 2:
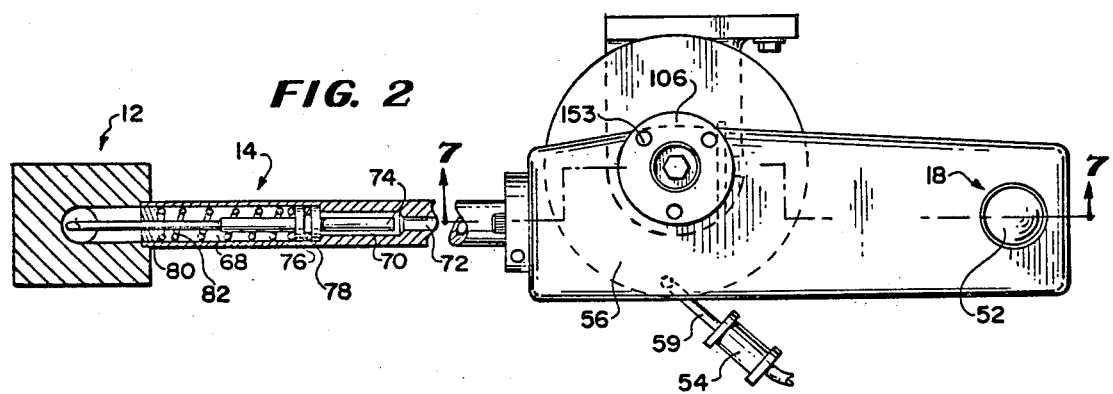
FIG. 2 is a plan view of the transfer mechanism of FIG. 1, partly broken away to show a portion of the transfer arm and the gripping head of the transfer mechanism.

The control signals elevate and lower the main body 16, the transfer arm 14 and the gripping head 12. As best shown in FIG. 2, the main body 16 is automatic operation is pivoted about the column 26 by the pneumatic cylinder 54 under the control of the automatic-operation, pneumatic-control system to be described hereinafter. The gripping head 12 is activated to grasp or release a workpiece when it is dropped upon a properly positioned probe in the same manner as in the manual operation of the transfer mechanism 10.

It can be understood from the above general description of the transfer mechanism 10 that the transfer mechanism 10 has many advantages such as: (1) it is simple in contruction and thus reliable an inexpensive; (2) it is easily set up for operation to receive and release workpieces at fixed locations; (3) the setup for receiving workpieces and releasing them is the same in automatic and manual operation; (4) the setup can be visually checked with ease; (5) it provides an automatic technique for locating the exact place to release or receive a workpiece during manual operation of the transfer mechanism; (6) it enables manual control of the transfer mechanism 10 with one hand without requiring that the control handle be released during operation; and (7) the same apparatus may be used with either automatic control or manual control by an operator.

TRANSFER ARM AND GRIPPING HEAD

The transfer arm 14 and gripping head 12 cooperate with the remainder of the transfer mechanism 10 to provide a means for enabling a workpiece to be gripped, moved and released by an operator with only one hand on the control handle without needing to remove his hand from the control handle and a means for holding the workpiece for at least a short time after the power is disconnected from the transfer mechanism.

In FIG. 2, there is shown the transfer mechanism 10 in a plan view, broken-away and partially sectioned to show the gripping head 12 and first, second, and third cylindrical pneumatic tube sections 68, 70 and 72, respectively, within the transfer arm 14. The first tube section 68, which has the largest diameter of the three sections, communicates at one end with the interior of the gripping head 12 and at the other end with the second tube section 70. The second tube section 70, which is the second largest diameter tube, communicates with the first tube section 58 at a first shoulder on its first end and with the third tube section 72 at its other end at a second shoulder. The third pneumatic tube section 72 communicates with the main source of air pressure when the control button 52 is depressed.

To activate the gripping head 12 in response to changes in air pressure, the cylindrical piston rod 74 extends along the longitudinal axis of the second and third pneumatic tube sections 70 and 72, with a cylindrical piston 76 including one or more conventional piston rings 78 fastened thereto and fitting within the first pneumatic tube section 68 to form a seal against the internal walls thereof.

To move the piston and piston rod 74 and 76 and to hold them in place, the transfer arm 19 includes a cylindrical plug 80 and a helical compression spring 82, with the cylindrical plug 80 closing the end of the first pneumatic tube adjacent to the gripping head 12. The piston rod 74 extends through the plug 80 and the helical compression spring 82 is positioned therearound between the piston 76 and the plug 80 to bias the piston 76 against the shoulder separating the first and second tube sections 68 and 70 so that, when air pressure is applied to the first, second and third pneumatic tube sections 68, 70 and 72 by depressing the control button 52, the piston 76 is moved forward, forcing air into the gripping head 12 and, when the source of air pressure is removed from the first, second and third pneumatic tube sections 68, 70 and 72 by releasing the control button 52, the piston 76 is moved back against the shoulder between the first and second tube sections to draw air through the gripping head 12 and to move the piston rod 74 back in the direction of the third pneumatic tube 72.

Figure 3:
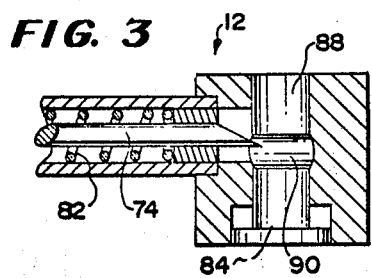
FIG. 3 is a sectional view of one embodiment of gripping head which may be included in the mechanism of FIG. 1.
Figure 4:
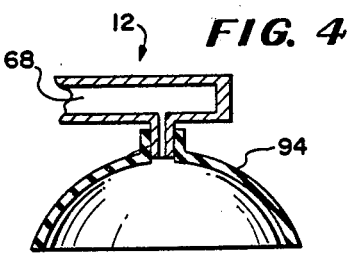
FIG. 4 is another embodiment of gripping head which may be used in the transfer mechanism of FIG. 1.

To grasp and hold the workpiece, either of three gripping devices shown in FIGS. 3, 4 and 5 are mounted within the gripping head 12 and cooperate with the piston rod 74 or with the piston 76. The particular gripping device is selected in accordance with the type of workpiece and the circumstances of use and all three gripping devices work with the transfer mechanism 10.

In FIG. 3, there is shown a magnetic gripping device mounted within the gripping head 12 having a permanent magnet 84 mounted for reciprocal movement within a cylindrical opening 86 of the gripping head 12 so that, in its extended position, its end surface is flush with the end surface of the gripping head 12 to engage a ferromagnetic workpiece, and in its retracted position, it is recessed within the gripping head 12 to release the ferromagnetic workpiece.

To hold and move the permanent magnet 84 within the gripping head 12, the magnetic gripping device includes a holder 88 having a slot 90 therein and the end of the piston rod 79 includes a ramp 92. The slotted holder 88 is attached to the magnet 84, with the slot 90 being aligned with the center portion of the ramp 92 on the end of the piston rod 74 so that as the piston rod 74 moves into the gripping head 12, the ramp 92 lifts the slotted holder 88 and the permanent magnet 84 and as the piston rod 74 moves from the gripping head 12, the permanent magnet 84 is permitted to drop downwardly by gravity.

In FIG. 4, there is shown a vacuum suction gripping head mounted within the gripping head 12 having a rubber suction cup 94 communicating at its inner end with the first tube section 68 so that, when air pressure pushes the piston 76 (FIG. 2) forward, suction in the suction cup 94 is released, causing any workpiece held in the gripping head to be dropped and when the air pressure is released so that the spring 82 forces the piston 76 back against the shoulder between the first and second pneumatic tube sections 68 and 70, vacuum pressure forces the workpiece into the rubber suction cup 94 where it is held.

In FIG. 5, there is shown a mechanical clamp mounted within the gripping head 12 having tongs 98 and 100 activated by the linkage 102 which is connected to the piston rod 74 so that when the piston is moved forward by air pressure, the tongs 98 and 100 are clamped together to grasp a workpiece and when the piston rod 74 is moved backward by the piston 76 and the spring 82, the tongs 98 and 100 are spread apart to release the workpiece.

Before the gripping head 12 and the transfer arm 14 are operated, the probes 40 and 42 (FIG. 1) are set with relation to the switches 48 and 50. The pressure switch 48 connects the three pneumatic tube sections 68, 70 and 72 to atmospheric pressure and the pressure switch 50 connects the three pneumatic tubes 58, 70 and 72 to the main source of pressure.

In operation, the probes 40 and 42 and the switches 48 and 50 cooperate together with the pneumatic tube sections 68, 70 and 72 and any one of the gripping devices shown in FIGS. 3, 4 and 5 to grasp or release a workpiece when the control button 52 is released to drop the main body 16 downwardly, causing one of the switches 48 and 50 to contact one of the probes 40 and 42. A releasing or gripping operation takes place in accordance with the selection of the probe and the switch that are being brought together.

To release a workpiece, the probe 42 is positioned to contact the pressure switch 50 when the control button 52 is released and the main body 16 drops downwardly. When the pressure switch 50 is contacted by the probe 42, the three pneumatic tube section 68, 70 and 72 in the transfer arm 14 (FIG. 2) are pressurized by the main source of pressure which forces the piston 76 against the helical compression spring 82 to move the piston rod 74 or air into the gripping head 12.

When the magnetic gripping device shown in FIG. 3 is included in the gripping head 12, the piston rod 74 forces the permanent magnet 84 upwardly into the recess 86 to free the workpiece.

When the vacuum gripping device shown in FIG. 4 is included in the gripping head 12, the air forced through the conduit or pneumatic tube 68 by the movement of the piston 76 forces the workpiece, which is being held by suction in the rubber cup 94, to be released.

When the mechanical gripping device shown in FIG. 5 is included in the gripping head 12, the forward motion of the piston closes the tongs 98 and 100 to release the workpiece.

To grasp a workpiece, the probe 40 is positioned to contact the pressure switch 48 when the control button 52 is released. With this arrangement, the three pneumatic tube sections 68, 70 and 72 are connected to atmospheric pressure as the main body 16 moves downwardly, causing the helical compression spring 82 to move the piston rod 74 back against the shoulder between the tube sections 70 and 72.

When the magnetic gripping device shown in FIG. 3 is included in the gripping head 12, the helical compression spring 82 in the transfer arm forces the piston 76 and the piston rod 74 (FIG. 2) back toward the third section 70 when the tubes are connected to atmospheric pressure so that the ramp 92 is withdrawn further from the slot 90 (FIG. 3), permitting the permenent magnet 84 to drop downwardly by gravity and contact the workpiece to hold it to the gripping head 12.

When the suction cup 94 is included in the gripping head 12, the movement of the piston 76 under the pressure of the helical compression spring 82 when the pneumatic tubes 68, 70 and 72 are connected to atmospheric pressure forces air from the suction cup 94 (FIG. 4) causing it to grasp the workpiece and hold it in the gripping head 12.

When the tongs shown in FIG. 5 are included in the gripping head 12, the movement of the rod 74 by the helical compression spring 82 in the direction of the third pneumatic tube section 72 causes the tongs 98 and 100 to open to release the workpiece.

As can be understood from the above description, the transfer arm 14 and the gripping head 12 have several advantages, such as: (1) the workpieces are grasped or released at the exact location without the necessity of the operator separately actuating a switch since the releasing or gripping action is initiated automatically when the body of the transfer mechanism drops onto the proper location; (2) the gripping device remains in its holding position when air pressure is removed from the transfer arm so that if the air pressure that operates the transfer mechanism 10 is accidientally disconnected during an operation, the gripping head 12 holds the workpiece until the power can be restored; (3) several different types of gripping devices are interchangeable and can easily be connected for use in the transfer mechanism; (4) the workpiece is always released when the transfer arm 14 is in its lowest position; and (5) the transfer arm 14 and gripping head are controlled with one hand of the operator on one control handle without his being required to release the control handle for different operations.

MAIN BODY, CONTROL HANDLE AND LOADING-UNLOADING CONTROL SECTION

The main body 16, control handle 18 and loading-unloading control section 20 are arranged to provide means for automatically releasing or gripping the workpiece when the gripping head 12 is properly located and to enable the transfer mechanism 10 to be easily set up and checked for this automatic procedure.

As best shown in FIG. 6, the control handle 18 includes a pneumatic switch 120 that connects a source of air under pressure to a column chamber 124 which elevates the main body 16 and the load-unload control section 20 includes the two pressure sensitive pneumatic switches 48 and 50 to connect a source of air under pressure to the chamber of the transfer arm 14 to operate the gripping head 12.

To apply air under pressure to the column chamber 124 that elevates the main body 16, the control handle 18 includes the three-way, normally-closed, pressure-sensitive pneumatic switch 120 which is closed by pressing the control button 52 that is located on the control handle 18. As long as the control button 52 is depressed, air under pressure is applied to the chamber at the top of the column 26 to raise the main body 16 and to permit it to be easily pivoted upon an air bearing.

To control the gripping and releasing of a workpiece by the gripping head 12, the load-unload control section 20 includes the first normally-closed, pressure-sensitive pneumatic switch 48 and the second normally-open, pressure-sensitive pneumatic switch 50, each being adapted to contact a different one of the probes 40 and 42 at different locations when the main body 16 is lowered by releasing the control button 52. The normally-open inlet port of the switch 50 is connected to a source of air pressure and its outlet port is connected to the inlet port of the normally-closed switch 48, the normally-closed outlet port of the switch 48 being connected to the third tubular section 72 of the transfer arm 14 to apply air pressure thereto. The normally-open outlet port of the switch 48 is vented to the atmosphere.

In the operation of the load-unload control section 20 illustrated in FIG. 6, the probe 42 is positioned to contact the pressure-sensitive switch 50 when the main body 16 of the transfer mechanism 10 is lowered at a work station to release a workpiece. At this time, the normally-open switch 50 is closed to connect the source of air through the switch 50 and the normally-closed switch 48 to the third tubular section 72 (FIG. 2) of the transfer arm 14 to cause the gripping head to release the workpiece. After the workpiece is released and the control button 52 of the control handle 18 is depressed to elevate the body, the normally-open switch 50 is again opened, but the gripping head 12 remains open since pressure continues to be applied to the tubular section 72, thus closing the vent.

When the gripping head 12 has been pivoted to the source of workpieces and the main body 16 has been lowered by releasing the control button 52, the pressure-sensitive switch 48 falls upon the probe 40, causing the normally-closed outlet port of the switch 48 to be disconnected and the third tubular section 72 to be vented to the atmosphere through the normally open outlet port, so that the gripping head grasps a new workpiece. When the main body 16 is again raised by depressing the control button 52, the switch 48 again returns to its normally-closed position to disconnect the third tubular section 72 from the atmosphere, but the workpiece remains held within the gripping head because pressure is not applied again to the tubular section 72 since the source of pressure is disconnected by the normally-open switch 50.

As best shown in FIG. 7, the main body 16 includes the pressure-sensitive air switches 48 and 50, the normally-open switch 120 in the control handle 18, a column cap 106, the base 56, the tubular air conduit 30 extending along the longitudinal axis of the support column 26, and a pressure chamber 124 above the column 26.

To raise and lower the main body 16 when air pressure is applied to the chamber 124 through the control handle 18, the main body 16 includes the column 26, the air conduit 38 passing along the longitudinal axis of the column 26, a spool-type air distributor 138, and the column cap 106.

To apply air under pressure to the load-unload section 20 and to raise and lower the main body 16 without requiring any substantial flexing of conduits, the conduit 122 is connected at one end to a primary source of air pressure and at its other end to the spool-type air distributor 138 (FIGS. 6 and 7), which distributor includes an annular relief section 142, a lower piston ring 144, a tubular orifice 146, and a second piston ring 148.

To apply air under pressure to the spool-type distributor 138, the tubular orifice 146 extends radially from the conduit 38 into the relief section 142, with the lower and upper piston rings 144 and 148 providing a seal against the escape of this air while permitting the main body 16 to move upwardly and downwardly with respect to the column 26.

To apply air pressure to the three-way normally-closed pressure-sensitive pneumatic switch 120, a conduit 150, mounted to the main body 16 for movement therewith, communicates at one end with the relief portion 142 at such a location as to continue communication with this relief portion as the body portion and the conduit 150 move with respect to the column 26. The conduit 140 (FIGS. 6 and 7) communicates at its other end with the three-way, normally-closed, pressure-sensitive pneumatic switch 120. With this arrangement, air under pressure is applied to the valve 120 and to the switch 50 through the conduit 151 without requiring the flexing of a conduit.

To raise the main body 16, the cap 106 includes a cylindrical inner recess 152, a plurality of bolts 153, and a piston element 154. The chamber 124 is defined between the bottom of the cap 106 and the top of the piston ring 148, with the piston element 154 being freely movable within the recess 152 to the bottom of the recess 152 where it restrains the main body 16 from further movement upward. The inlet port 156 communicates with the chamber 124 and with an outlet port of the switch 120 through a conduit 155. The bolts 153 are circumferentially spaced around the cap 106 and hold it to the main body 16.

With this arrangement, when air under pressure is applied through the conduit 155 (FIG. 6) to the inlet port 146 and the chamber 124, the cap 106 has air pressure exerted against it to move the main body 16 to its upper position. The air flowing around the piston element 154 and out of the cylindrical recess 152 and the air pressure against the cap 106 supports the body portion in a type of air bearing in an upper position so that it may be pivoted freely.

To apply air under pressure from the spool distributor 138 to the column chamber 124, the control handle 18 includes the control button 52, a plunger 157, a handle frame 158, a bushing 160, the normally-closed valve 120, a first opening 166 and second opening 168.

The plunger 157 is connected to the control button 52 at its upper end and the switch 120 at its lower end, being slidable in the bushing 160 within the frame 158 of the handle 18 and biased upwardly by the valve 120. The first opening 166 and the second opening 168 communicate with the atmosphere and conduit 150, respectively. In the first position the button 52 is depressed to exert pressure on the switch 120 through the plunger 157 to connect conduits 150 and 155 (FIG. 6) to apply pressure to column chamber 124 and in a second position the button 52 is released to remove pressure from the switch 120 to connect the conduit 155 and the chamber 124 to atmosphere.

With this arrangement, depressing the button 52 applies air pressure to the chamber 124 and releasing the button 52 vents the chamber 124 to the atmosphere.

To control the flow of air under pressure to the third section 72 of the transfer arm 14 (FIG. 2), the two pressure switches 48 and 50 are mounted underneath the frame of the main body 16 by screws, one of which is shown at 172. The probe arms 40 and 42 include inserts 174 and 176 in their upper ends adapted to engage the switches 48 and 50 to actuate the same.

The switches 120, 48 and 50 are standard pressure-sensitive, three-way, two-position pneumatic switches. There are several types of switches known in the prior art and commercially sold. One commercially sold suitable type of switch is the "Y" series three-way cartridge valves sold by Humphrey Air Control Specialist, Kilgore at Sprinkle Road, P.O. Box 2008, Kalamazoo, Michigan 49003.

The exact location of the conduits connecting the switches and the spool valve are not shown in FIG. 7 since they may be positioned at any location within the frame of the main body 16. However, the schematic drawing in FIG. 6 shows the connections between the various switches, the column chamber 124, and the spool valve 138 adequately to enable proper placement of the conduits to contact the parts of these elements.

AUTOMATIC-OPERATION PNEUMATIC-CONTROL SYSTEM

Figure 8:
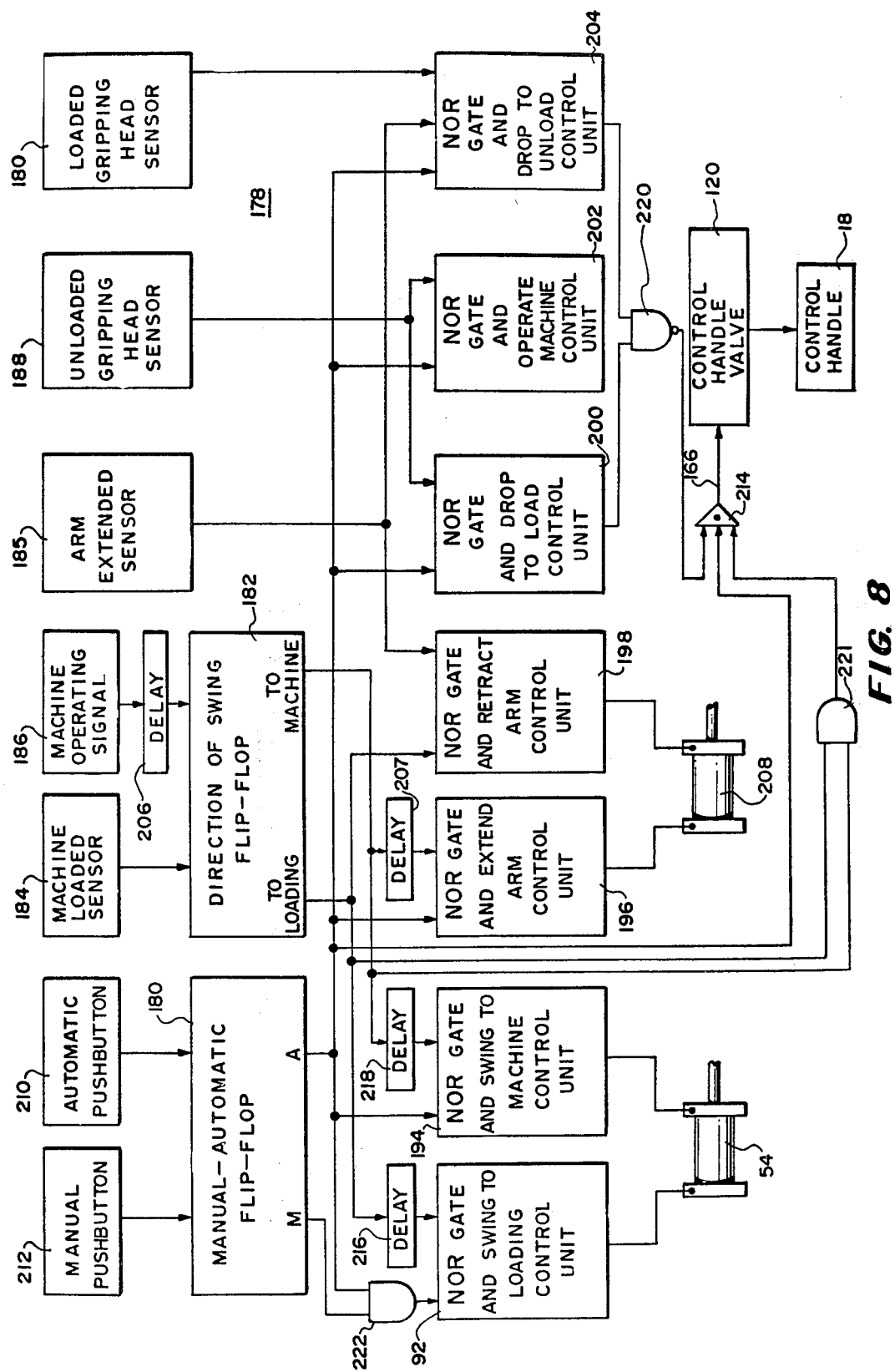
FIG. 8 is a block diagram of the air logic system used in the embodiment of transfer mechanism shown in FIG. 1.

In FIG. 8, there is shown a logical block diagram 178 of the automatic-operation pneumatic-control system having a first manually-controlled pneumatic flip-flop 180, a pneumatically-controlled pneumatic flip-flop 182, five position sensors 184, 185, 186, 188 and 180, seven NOR gate control units 192-204, two pneumatic cylinders 54 and 208, two pushbuttons 210 and 212, a NOR gate 214, four time delays 216, 218, 206 and 207, a NOR gate 220, and two OR gates 201 and 222.

To select the manual operation or the automatic operation mode of the transfer mechanism 10, the manually controlled flip-flop 180 includes first and second pressure-sensitive pneumatic valves (not shown), with each of the valves being connected to different ones of the colored push-buttons 210 and 212 which trigger the pneumatic flip-flop 180 into either the automatic operation or the manual operation modes.

to control the direction the transfer arm 14 swings, the direction-of-swing flip-flop 182 has one input connected to the machine loaded sensor 184 to switch the flip-flop 182 to its to-loading state and its other input connected to the machine-operating signal output 186 to switch the flip-flop to-machine state.

To prevent the transfer mechanism 10 (FIG. 1) from unexpectedly continuing operation after a power interruption, the pneumatic flip-flop 180 is biased to the manual operation mode. With this bias, if the power is suddenly applied to the transfer mechanism after an interruption during automatic operation, the transfer arm 14 will not swing but remain in manual mode until the flip-flop 180 is reset into its automatic position.

To sense the position of the gripping head 12 of the transfer mechanism 10, the transfer mechanism 10 includes four sensing devices which are: (1) sensing device 184 which senses the gripping head when it is in the loading station; (2) sensing device 186 which senses when a machine to which the workpieces are being supplied has operated to perform work on the workpieces; (3) sensing device 188 which senses when a workpiece has been unloaded from the gripping head 12, and (4) sensing mechanism 190 which senses when the workpiece has been loaded into the gripping head. A fifth sensing device 185 is included in embodiments in which a transfer arm is to be extended at a work station to sense when the gripping head has moved into the work station. These sensing devices may be optical or mechanical transducers or may, in appropriate cases, be operated by signals that are generated by the machine which is performing the work. In the preferred embodiment, the outputs of the sensors are pneumatic.

To cause the pneumatic cylinder 54 to extend its piston rod and swing the transfer arm of the transfer mechanism (FIGS. 1 and 2) into the loading station, the NOR gate and swing-to-loading station control unit 192 has two inputs, the coincidence of which results in the flow of air under pressure to a first of the two input ports of the pneumatic cylinder 54, with one of the inputs to the NOR gate and swing-to-loading control unit 192 being connected to the automatic-operation output terminal of the manual-automatic flip-flop 180 and the other input being connected to the to-loading station output terminal of the direction-of-swing flip-flop 182.

With these connections, the transfer arm 14 swings to the loading station only during automatic operation and when the machine-loaded sensor 184 has switched the direction-of-swing flip-flop 182 to the to-loading station mode, indicating that a workpiece has been sensed within the machine.

To swing the transfer arm 14 from the loading station or from a neutral station into a machine to load a workpiece therein, and NOR gate and swing-to-machine control unit 194 includes two inputs, the coincidence of which causes air under pressure to be applied to a second port of the pneumatic cylinder 54 to cause the pneumatic cylinder 54 to retract its piston rod, thus swinging the transfer arm 14 toward the machine, with one of the inputs to the NOR gate and swing-to-machine control being connected to the automatic output terminal of the manual-automatic flip-flop 180 and the other input being connected to the to-machine output of the direction-of-swing flip-flop 182 through the time delay 218.

With these connections, the transfer arm swings toward the machine a period of time determined by the delay 206 after a machine operating signal is generated so that the machine has time to kick the workpiece from the machine and to lower its stop pin before the transfer arm arrives with a new workpiece. Of course, if the machine does not automatically eject the workpieces, the delay is still necessary so that the transfer arm arrives to pick up the workpiece after it has been machined and the stop pin has been retracted by the machine.

In some transfer mechanisms, the transfer arm 14 has a telescoping attachment which is extended and retracted by a pneumatic cylinder 208 attached to the transfer arm and having first and second input ports. In this embodiment, the transfer arm is intended to swing into position near the machine and then extend to the proper location to deposit the workpiece.

To operate the pneumatic cylinder 208 for the purpose of extending the transfer arm 14 in this embodiment, the NOR gate and extend-arm control unit 196 includes two inputs, the coincidence of which applies air pressure to the first port of the cylinder 208 and causes the transfer arm 14 to extend, with one input being connected to the automatic output of the manual-automatic flip-flop 180 and the other input being connected to the to-machine output of the direction-of-swing flip-flop 182 through the time delay 207 so that the arm is extended only when the machine operating signal has been received after a time delay determined by the delay 206 and the delay 207. The delay 207 permits the transfer arm to swing into position before it is extended.

To retract an extended arm in this embodiment, the NOR-gate and retract arm control unit 198 includes three inputs, the simultaneous energization of which activates the pneumatic piston 208 through the second port to retract its piston rod, with the first input being connected to the automatic output of the manual-automatic flip-flop 180, the second input being connected to the to-loading output of the direction-of-swing flip-flop 182 and the third input being connected to the arm extended sensor 185. With this arrangement, the piston rod of the piston 208 is not retracted until the machine loaded sensor 184 senses a workpiece properly loaded and the arm extended sensor 185 senses that the arm is in position. Of course, when it is not necessary to extend the arm, the NOR-gate-and-extend-arm control unit 196, the delay 207, the NOR-gate-and-retract-arm control unit 198 and the arm-extended sensor 185 are not necessary.

To control the lifting and falling of the main body 16, the NOR-gate-and-drop-to-load control unit 200 and the NOR-gate-and-drop-to-unload control unit 204, each have an output connected to the conduit 166 (FIG. 7) through the NOR gate 220 so as to normally apply air pressure to the chamber 124 through the conduit 155 (FIG. 6) and the normally closed ports of valve 120. With this connection, air pressure is applied to the chamber 124 to elevate the main body 16 and is vented to atmosphere to drop the main body under the control of the automatic-operation, pneumatic-control system.

The NOR-gate-and-drop-to-load control unit 200 has one of its two inputs connected to the automatic-operation output terminal of the manual-automatic flip-flop 182 and the other of its two inputs connected to the unloaded-gripping-head sensor 188 to cause the NOR-gate-and-drop-to-load control unit to vent the chamber when the unloaded-gripping-head sensor 188 senses the gripping head in the loading station and the NOR-gate-and-drop-to-unload control unit 204 has a first of its three inputs connected to the automatic-operation output terminal of the manual-automatic flip-flop 182, a second of its inputs connected to the arm-extended sensor 185 and a third of its inputs connected to the loaded gripping-head sensor 190 to cause the NOR-gate-and-drop-to-unload control unit to vent the chamber when the gripping head 12 is sensed in the work station. In embodiments which do not extend the transfer arm 12, a two-input NOR-gate-and-drop-to-unload control unit may be substituted for the three-input NOR-gate-and-drop-to-unload control unit 204 and the arm-extended sensor 185 is not required.

To control the operation of the machine to work upon the workpiece, the NOR gate and operate-machine control unit 202 includes two inputs, the coincidence of which initiates a machine operation, with one of the inputs being connected to the automatic output of the manual-automatic flip-flop 180 and the other input being connected to the output of the unloaded gripping-head sensor 188 which detects the gripping head at the loading station so that the machine does not begin to operate unless the gripping head has left the machine and returned to the loading station.

The NOR gate and control units 192–204 are a combination of pneumatic NOR gates connected to pneumatic boosters. Such units are commercially available on the market in a form suitable for incorporation by persons skilled in the art in the control system shown in FIG. 8. While a pneumatic control system is described as the preferred embodiment, it is obvious that an electrical system may be used as well by substituting electrical units for the equivalent pneumatic units shown in FIG. 8 in a manner known in the art.

Before operating the transfer mechanism 10 in the Automatic mode using the automatic-operation pneumatic-control circuit shown in FIG. 8, the output of the NOR gate 220 is connected to the passageway 166 (FIGS. 6, 7 and 8) to communicate through the normally closed contacts with the passageway 155 and the column chamber 124. With this connection, the automatic-operation pneumatic-control unit is able to control the rising and falling of the main body 16.

The probes 40 and 42 are positioned in place in the same manner as described in connection with the manual operation of the transfer mechanism 10. When the automatic-operation pneumatic-control unit of FIG. 8 and the probes 40 and 42 are properly positioned, the automatic push button 210 (FIG. 8) is depressed which starts automatic operation and causes red indicators to be shown on the instrument panel (not shown) of the automobile-operation pneumatic-control unit.

In automatic-operation, when the gripping head 12 is sensed by the unloaded gripping head sensor 188 in the loading station, the NOR-gate-and-drop-to-load control unit 200 receives coincident pneumatic signals from the automatic state output of the manual-automatic flip-flop 180 and from the gripping head sensor 188. When the NOR-gate-and-drop-to-load control unit 200 receives these pneumatic signals, it applies a pneumatic pulse to the NOR gate 220, which terminates its output to the AND gate 214, causing the AND gate 214 to terminate its application of air under pressure to the conduit 166. When air under pressure is not applied to the conduit 166, the column chamber 124 (FIG. 6) is permitted to fall, causing the main body 16 to drop.

When the main body 16 drops, the probe 40 contacts the pressure sensitive switch 48, causing the switch 48 to open its normally-closed contact and connect the passageway section 72 (FIG. 2) of the transfer arm 14 (FIG. 6) to atmosphere, thus causing the gripping head 12 to grasp a workpiece.

The pneumatic pulse from the unloaded-gripping-head sensor 188 also energizes the NOR-gate-and-operate-machine control unit 202 to cause a machine operation to take place.

When the gripping head 16 has fallen to the supply of workpieces, the pneumatic pulse from the unload-gripping-head sensor 188 terminates, thus removing the pulse applied to the NOR gate 220 and the NOR-gate-and-drop-to-load control unit 200. The AND gate 214 now applies air pressure to the conduit 116 in the control handle valve 120 to cause the main body 16 to rise.

Until a short time after the machine has operated, the AND gate 214 is energized by signals from the NOR gate 220, the automatic output terminal of the manual-automatic flip-flop 180, and the to-loading output of the direction-of-swing flip-flop 182 through the NOR gate 221. After the machine has operated, the direction-of-swing flip-flop 182 is switched to the to-machine output terminal by a pulse applied from the machine operating signal 186 through the delay 206. However, this does not affect the air pressure applied to the conduit 166, since a signal continues to be applied through the NOR gate 221 but is applied from the to-machine output terminal rather than the to-loading output terminal of the direction-of-swing flip-flop 182.

After the machine has operated, the direction-of-swing flip-flop 182 has been switched to the to-machine state by a signal applied to it thorugh the delay 206 from the machine operating signal 186, the NOR-gate-and-swing-to-machine control unit 194 receives coincident pulses through the delay 218 from the to-machine output terminal of the direction-of-swing flip-flop 182 and the automatic output terminal of the manual-automatic flip-flop 180, causing the NOR-gate-and-swing-to-machine control unit 194 to apply air under pressure to the extend port of the pneumatic cylinder 54. The pneumatic cylinder 54 extends its piston rod to swing the transfer arm 14 and the gripping head 12 (FIG. 1) into the work station in response to the air pressure applied to its extend port.

When the gripping head 12 has moved to the work station, in an embodiment in which the arm is to be extended, the NOR-gate-and-extend-arm control unit 196 receives coincident signals from the automatic output terminal of the manual-automatic flip-flop 180 and the to-machine output terminal 182, one signal of which is delayed by the delay 208 to permit the arm to reach its proper position before the NOR-gate-and-extend-arm control unit 196 is energized. When the control unit 196 is energized, the pneumatic cylinder 208 receives air under pressure on its first port, causing it to extend its piston rod to extend the transfer arm 14. Of course, in embodiments where the transfer arm 14 is not to be extended, this last unit is unnecessary.

When the gripping head 12 is moved into the proper position within the work station, the loaded-gripping-head sensor 190 senses the head and applies a signal to the NOR-gate-and-drop-to-unload control unit 204, which also receives signals from the automatic output terminal of the manual-automatic flip-flop 180 and, in an embodiment in which the arm is extended, from the arm-extended sensor 185. At this time, the NOR-gate-and-drop-to-unload control unit 204 terminates its signal to the AND gate 214 by applying a signal to the NOR gate 220. When the AND gate 214 no longer receives a signal from the NOR gate 220, the AND gate 214 ceases to apply air under pressure to the conduit 166 (FIGS. 6 and 7), causing the column chamber 124 to have reduced pressure in it and thus permitting the main body 16 to fall.

When the main body 16 falls, the probe 42, contacts the pressure-sensitive switch 50, causing its normally open contact to close to connect the passageway section 72 (FIG. 2) in the transfer arm 14 to a source of air through the spool valve 138. When the passageway section 72 receives the air under pressure, the gripping head 12 releases the workpiece into the work station.

When the gripping head 12 has dropped to release the workpiece, the NOR-gate-and-drop-to-unload control unit 204 terminates its signal to the NOR gate 220, causing the AND gate 214 to reapply pressure to the conduit 166 (FIGS. 6 and 7). The column chamber 124 is now again pressurized and lifts the main body 16.

When the workpiece has been dropped into the work station, the machine loaded sensor 184, applies a signal to the to-loading input terminal of the direction-of-swing flip-flop 182, which responds by switching to the to-loading state. When the direction-of-swing flip-flop 182 is in the to-loading state, signals continued to be applied to the AND gate 214 through the NOR gate 220, through the NOR gate 221, and from the automatic output terminal of the manual-automatic flip-flop 180, with the signal applied through the NOR gate 221 originating from the to-loading output terminal rather than the to-machine output terminal of the direction-of-swing flip-flop 182 so that the main body 16 continues to be elevated and ready to be pivoted.

The to-loading output terminal also applies signals to the NOR-gate-and-retract-arm control unit 198 and to the NOR-gate-and-swing-to-loading-station control unit 192 through the delay 216. The NOR-gate-and-retract-arm control unit 198 energizes the pneumatic cylinder 208 to retract the transfer arm 14 in embodiments having a retractable transfer arm and the NOR-gate-and-swing-to-loading-station control unit 192 applies pressure to the retract port of the pneumatic cylinder 54 after a time delay that enables the transfer arm 14 to be retracted, causing the main body 16 to pivot back to the loading station.

Once the gripping head 14 is in the loading station, the cycle above repeats with the loading head being sensed by the unloaded-gripping-head sensor 188.

If the power is interrupted during automatic operation of the transfer mechanism 10, the transfer arm 14 stops but the gripping head 12 retains a workpiece if it has one already in its grasp for reasons described above. When the power is again restored, the transfer arm 14 remains stopped in the manual mode of operation until the automatic push button 210 is depressed. This operation avoids accidents since the work station must be ready to receive a workpiece when power is restored since workmen may have altered the station in attempting to restore power or while waiting for power to be restored.

The transfer arm 14 returns to the loading station when the Automatic Button is depressed after power is restored after it has been accidentally interrupted because the direction-of-swing flip-flop 182 is biased to the to-loading state. To accomplish this, the NOR-gate-and-swing-to-loading-station control unit 192 receives its two coincident pulses from the to-loading output terminal of the direction-to-swing flip-flop 182 and from either the manual or the automatic output terminals of the manual-automatic flip-flop 180 through the NOR gate 222. Upon depressing the automatic operation push button 210, the automatic-operation pneumatic-control unit again controls the automatic operation of the transfer mechanism 10 after power is restored.

From the above description, it can be seen that the automatic-operation pneumatic-control unit shown in FIG. 6 has the advantages of: (1) being compatible with a manual control unit; (2) being easily connected to a transfer mechanism that is designed for manual control; and (3) switching to the manual mode of operation whenever power is restored after an accidental power interruption.

Although a preferred embodiment has been described with some particularity, many modifications and variations of the invention are possible in the light of the above teachings. It is therefore to be understood that, within the scope of the appended claims, the invention may be practiced otherwise than as specifically described.

What is claimed is:

1. A transfer mechanism comprising:
a movable portion and a stationary portion;
gripping means for grasping and releasing an article;
transfer means for moving said movable portion with respect to said fixed portion, whereby an article carried in said gripping means is moved from location to location;
automatic control means for controlling said transfer means to move said movable portion automatically from place to place;
manual control means for moving said movable portion from place to place;
switch means for selecting one of said automatic and manual means for moving said movable portion from place to place;
biasing means for biasing said control means to said manual mode of operation;
said automatic control system being a fluidic logic system;
said fluidic logic system including sensing means for sensing the position of said movable portion; and
said biasing means including means for switching said control means to a manual mode of operation when power is restored after an accidental interruption of power.

2. A transfer mechanism comprising:
a movable portion and a stationary portion;
gripping means mounted to said movable portion for gripping and releasing an article;
transfer means for moving said movable portion, whereby an article is moved from one location to another location;
said stationary portion including a support column;
first and second conduits;
said support column including said first conduit;
said movable portion including said second conduit;
said transfer means including an air bearing and at least one valve;
said first and second conduits communicating with each other and being transverse at least at one location;
said movable portion including an internal wall defining a chamber between said column and said movable portion;
said second conduit communicating with said chamber;
one of said first and second conduits communicating with said chamber and the other being adapted to communicate with a source of air pressure;

said valve means communicating with one of said first and second conduits, whereby air under pressure is applied to said chamber upon opeing said valve means and disconnected from said chamber upon closing said valve means; and means for forming a movable seal between said first conduit and said second conduit at the point of communication therebetween, whereby said stationary portion and said movable portion may move with respect to each other without disconnecting the source of air pressure from said chamber when said valve means is open.

3. A transfer mechanism according to claim 2 in which said gripping means includes:
means for releasing an article in response to air pressure and gripping an article in response to the termination of said air pressure; and
second valve means connecting said gripping means to said first of said first and second conduits.

4. A transfer mechanism according to claim 2 further including:
control means for selectively opening and closing said gripping means to selectively release and grasp an article;
said control means including first and second adjustable position detecting switch means for detecting the position of said movable portion;
said first adjustable position-detecting switch means including an actuatable means for opening said gripping means to release an article; and
said second adjustable position-detecting switch means including a second actuatable means for closing said gripping means to grasp an article.

5. A transfer mechanism according to claim 4 in which said transfer means includes:
first means for moving said movable portion along a first path and second means for moving said movable portion selectively along a second path and a third path;
said first path being located above said one location and other location;
said second path being between said one location and a portion of said first path; and
said third path being between said another location and another portion of said first path.

6. A transfer mechanism according to claim 5 in which:
said transfer means includes a handle mounted to said movable portion;
said handle including a control button;
said control button including means for moving said movable portion along said second and third paths.

7. A transfer mechanism according to claim 2 in which said gripping means includes:
means for causing said gripping means to release an article upon the application of power thereto; and
means for causing said gripping means to grasp an article upon the disconnection of power thereto.

8. A transfer mechanism according to claim 2 further including:
automatic control means for controlling said transfer means to move said movable means automatically from place to place;
manual control means for moving said movable means from place to place;
switch means for selecting one of said automatic and manual means for moving said movable portion from place to place; and
biasing means for biasing said control means to said manual mode of operation.

9. A transfer mechanism according to claim 8 in which said switch means is a flip-flop.

10. A transfer mechanism according to claim 8 in which said automatic control system is a fluidic logic system.

11. A transfer mechanism according to claim 2 further including a fluidic logic system having a sensing means for sensing the position of said movable portion.

12. A transfer mechanism comprising:
a movable portion and a stationary portion;
gripping means mounted to said movable portion for gripping and releasing an article;
transfer means for moving said movable portion, whereby an article is moved from one location to another location;
said stationary portion including a support column;
said transfer means including an air bearing and at least one valve;
said movable portion including an internal wall defining a chamber between said column and said movable portion;
conduit means communicating with said chamber and a source of air pressure;
valve means including said valve for applying air under pressure to said chamber upon opening said valve and disconnecting said air under pressure from said chamber upon closing said valve;
said chamber including movable seal means between said movable portion and said stationary portion at the point of communication with said conduit means, whereby said stationary portion and said movable portion move with respect to each other without disconnecting the source of air pressure from said chamber when said valve means is open; and
fluidic logic means for controlling said valve means.

13. A transfer mechanism according to claim 12 in which said gripping means includes:
means for causing said gripping means to release an article upon the application of air pressure thereto; and
means for causing said gripping means to grasp an article upon the disconnection of air pressure thereto.

14. A transfer mechanism according to claim 12 including:
automatic control means for controlling said transfer means to move said movable portion automatically from place to place;
manual control portion for moving said movable means from place to place;
switch means for selecting one of said automatic and manual means for moving said movable portion from place to place; and
biasing means for biasing said control means to said manual mode of operation.

15. A transfer mechanism according to claim 14 in which said automatic control system is a fluidic logic system.

16. A transfer mechanism comprising:
a movable portion and a stationary portion;
gripping means carried by said movable portion for selectively grasping and releasing an article;
transfer means for moving said movable portion with respect to said stationary portion to move an article from place to place;

said gripping means including means for continuously gripping an article when power is disconnected from said transfer mechanism;
said means for continuously grasping including means for causing said gripping means to release an article upon the application of power thereto and means for causing said gripping means to grasp an article upon the discontinuation of power thereto;
a pneumatic cylinder;
valve means for selectively applying air to and disconnecting a source of air from said pneumatic cylinder;
piston means;
means biasing said piston away form said gripping means;
means connected to said piston for causing said gripping means to grip an article when said piston is moved away from said gripping means and to release an article when said piston is moved towards said gripping means;
control means for applying air pressure to said piston means to move said piston means toward the gripping means;
said gripping means further comprising a magnet; a holder mounted to said magnet; and a rod connected to said piston;
one of said rod and holder including internal walls defining an opening; and
the other of said holder and rod including a ramp engaged within said opening, whereby the movement of said piston toward said gripping means lifts said holder and magnet and the movement of said piston away from said gripping means lowers said holder and said magnet.

17. A transfer mechanism, comprising:
a movable portion;
a stationary portion;
said movable portion including gripping means for holding and releasing an artical;
transfer means for moving said movable portion with respect to said stationary portion to move an article from a first predetermined location to at least a second predetermined location;
control means for selectively opening and closing said gripping means to selectively release and grasp an article;
said control means including first and second adjustable position detecting switch means for detecting the position of said movable portion;
said first adjustable position-detecting switch means including an actuatable means for opening said grip means to release an article;
said second adjustable position-detecting switch means including a second actuatable means for closing said gripping means to grasp an article;
said first switch means including a first-switch primary sensing part and a first-switch secondary sensing part;
one of said first-switch primary and first-switch secondary sensing parts being mounted to said movable portion;
the other of said first-switch primary and first-switch secondary sensing parts being stationary;
said one of said first-switch primary parts and first-switch secondary parts being positioned on said movable portion to approach the other of said first-switch primary and first-switch secondary parts when said gripping means is in said first location;
means for opening said gripping means when said first-switch primary sensing part and first-switch secondary sensing part are within actuatable distance of each other;
said second-switch sensing part including a second-switch primary sensing part and a second-switch secondary sensing part;
one of said second-switch primary and second-switch secondary sensing parts being mounted to said movable portion;
the other of said second-switch primary and second-switch secondary sensing parts being stationary;
said one of said second-switch primary sensing part and second-switch secondary sensing parts being positioned on said movable portion to approach the other of said second-switch primary sensing part and second-switch secondary sensing part when said gripping means is in said second location;
means for closing said gripping means when said second-switch primary sensing part and second-switch secondary sensing part are within retractable distance of each other;
first means for moving said movable portion along a first path and second means for moving said movable portion selectively along a second path and a third path;
said first path being located above said first and second locations;
said second path being between said first location and a portion of said first path;
said third path being between said second location and another portion of said first path;
said transfer means including a handle mounted to said movable portion;
said handle including a control button;
said control button including means for moving said movable portion along said second and third paths;
said transfer means including a support column and an air bearing;
said movable portion resting upon said air bearing;
said air bearing connecting said support column to said movable means;
valve means for controlling air pressure to said air bearing, whereby said movable portion is selectively raised along said second and third paths under the control of said control button and moved along said first path by pivoting about said support column;
a fluid-operated cylinder having a piston and piston rod;
said fluid-operated cylinder connecting said movable portion and said stationary portion between a cylinder and piston rod and a movable part connected to said movable portion;
said movable portion being pivotable about said support column by said pneumatic cylinder;
automatic control means for automatically controlling the operation of said fluid-operated cylinder for automatic operation of said transfer mechanism;
said control means including means for de-energizing said automatic control means to permit manual operation of said transfer mechanism; and
means for causing said control means to select manual operation upon resumption of power after an accidental interruption of power to said control means.

* * * * *